United States Patent [19]

Venot

[11] Patent Number: 4,899,836

[45] Date of Patent: Feb. 13, 1990

[54] HYDRAULIC PERCUSSION INSTRUMENT AND METHOD OF OPERATING SAME

[75] Inventor: Aime Venot, Villeurbanne, France

[73] Assignee: Etablissements Montabert, Saint-Priest, France

[21] Appl. No.: 886,546

[22] Filed: Jul. 16, 1986

[30] Foreign Application Priority Data

Jul. 16, 1985 [FR] France ............................ 85 11346
Mar. 18, 1986 [FR] France ............................ 86 04302

[51] Int. Cl.⁴ ............................ B23B 45/16
[52] U.S. Cl. ............................ 173/134
[58] Field of Search ............ 173/116, 119, 134, 13, 173/14, 15

[56] References Cited

FOREIGN PATENT DOCUMENTS 3505732 8/1986 Fed. Rep. of Germany ...... 173/116

*Primary Examiner*—Douglas D. Watts
*Assistant Examiner*—Willmon Fridie, Jr.
*Attorney, Agent, or Firm*—Herbert Dubno; Andrew Wilford

[57] ABSTRACT

A reciprocating percussion instrument has a housing forming an axially centered chamber having a front end and formed thereat with a pair of adjacent ports, a tool projecting from the housing and exposed axially in the chamber, and a double-acting piston forming front and back compartments and axially reciprocatable between a rear end position and a front end position at least generally in axial engagement with the piston. The piston has a groove forming a fluid-connection path in the chamber between the ports only in the front end position of the piston. A conduit connects one of the ports to one of the sides of the pressure source. A controller includes a pilot line connected to the other of the ports and a distributor valve connected between high- and low-pressure sides of a hydraulic pressure source and the compartments to cyclically alternately pressurize and depressurize the compartments and thereby axially reciprocate the piston between its end positions at a frequency dependent on pressure in the pilot line. A pilot-feed system at least peridocially connects a one of the sides of the source to the pilot line for biasing the pressure of same away from that of the side of the source connected to the conduit.

15 Claims, 9 Drawing Sheets

HYDRAULIC PERCUSSION INSTRUMENT AND METHOD OF OPERATING SAME

FIELD OF THE INVENTION

The present invention relates to a hydraulic hammer-type tool. More particularly this invention concerns a hydraulic hammer or chipper and a method of operating same.

BACKGROUND OF THE INVENTION

A standard hydraulic hammer or chipper has a housing, a tool axially reciprocal in the housing and engageable with a workpiece, a piston axially reciprocal in the housing and having a front face engageable with the tool to drive it against the workpiece, and an automatic distributor valve which alternately pressurizes and depressurizes front and back chambers of the normally double-acting piston to reciprocate it axially against the tool. The distributor valve is fed with hydraulic fluid at a generally constant pressure.

When the material being hammered is hard, stone for instance, best penetration is achieved by reciprocating the tool slowly and striking the piston against the tool with great force. Contrarily, when the material is soft it is advisable to use a succession of less powerful but more frequent blows.

The frequency with which the hammer piston reciprocates is largely a function of the pressure that is applied to it on the forward stroke. This pressure is typically adjustable by means of a pressure-control valve connected right in the housing between the incoming hydraulic line and the reversing valve. With a double-acting assembly the return pressure or the counter pressure is easily adjusted to slow or speed up the reciprocation of the piston. Thus a standard configuration for such a hammer or scaler has a simple adjustment knob or the like which is regulated by the user according to work conditions.

In another type of system described in French patent 2,375,008 a remote pneumatic or electrohydraulic control system works with a plurality of different feed openings in the hammer piston's chamber to vary the frequency of the hammer blows by varying the stroke length. The force with which the piston strikes is increased as the stroke length increases. Such a device must be set by the user in accordance with instantaneous work conditions.

OBJECTS OF THE INVENTION

It is therefore an object of the present invention to provide an improved method of and system for operating a percussion tool.

Another object is the provision of such a method of and system for operating a percussion tool which overcomes the above-given disadvantages, that is which does not need to be manually adjusted for work conditions.

SUMMARY OF THE INVENTION

A reciprocating percussion instrument wherein a piston is alternately oppositely pressurized by an automatic reversing valve to cyclically strike a tool is operated according to the invention by monitoring the time that the piston resides during each cycle generally in an end position contacting the tool and by adjusting the frequency and/or force in accordance with the time the piston resides generally in the end position.

The invention is based on the surprising discovery that the amount of time the piston spends at or near its advanced end position against the tool is an excellent gauge of the hardness of the workpiece. Thus when the workpiece is hard the tool and piston bounce back rapidly, the rebound being faster as the workpiece gets harder. On the other hand when the workpiece is soft the piston actually drives and follows the tool, and does not reverse by rebound, but is hydraulically withdrawn so that its residence time at or near the tool-engaging end position is relatively long. The instant invention exploits this characteristic to make the tool automatically set itself in accordance with instantaneous working conditions.

According to this invention the frequency is increased as the time generally in the end position increases and vice versa. It is also possible to decrease the force as the time generally in the end position increases and vice versa.

More specifically according to this invention the time that the piston resides during each cycle generally in an end position contacting the tool is monitored and an output corresponding thereto is generated. Then the frequency is adjusted in accordance with the output by increasing it when the residence time of the tool in the end position increases and decreasing it when the residence time decreases.

The reciprocating percussion instrument according to the invention has a housing forming an axially centered chamber having a front end and formed thereat with a pair of adjacent ports, a tool projecting from the housing and exposed axially in the chamber, and a double-acting piston forming front and back compartments and axially reciprocatable between a rear end position and a front end position at least generally in axial engagement with the piston. The piston has a groove forming a fluid-connection path in the chamber between the ports only in the front end position of the piston. A conduit connects one of the ports to one of the sides of the pressure source. A controller includes a pilot line connected to the other of the ports and a distributor valve connected between high- and low-pressure sides of a hydraulic pressure source and the compartments to cyclically alternately pressurize and depressurize the compartments and thereby axially reciprocate the piston between its end positions at a frequency dependent on pressure in the pilot line. A pilot-feed system at least periodically connects a one of the sides of the source to the pilot line for biasing the pressure of same away from that of the side of the source connected to the conduit.

In this simple manner it is possible to generate the above-mentioned hydraulic output which is nothing more than a pressure in the pilot line which is proportional to the amount of residence time in the forward end position. Since this residence time itself is a function of the hardness of the material being hammered, the result is wholly automatic self adjustment of the tool of this invention.

According to a feature of this invention the pilot feed system has a buffer valve having a slide defining a compartment connected to the pilot line. In one system the one port is connected by the conduit to the high-pressure side and the slide defines another compartment connected to the low-pressure side. In this case the slide is formed with a restricted passage constituting the pilot-feed means.

In another system according to the invention the one port is connected by the conduit to the low-pressure side and the slide defines another compartment connected to the high-pressure side. Here the slide is formed with a restricted passage constituting the pilot-feed means.

The pilot-feed system can further include a high-pressure port connected to the high-pressure side and opening into the chamber at a location connected via the groove to the other port in an intermediate position of the piston between its end positions. This slide defines another compartment connected to the low-pressure side. In addition the high-pressure port and the other port flank the one port and are at an axial spacing greater than the axial width of the groove. Thus the groove cannot interconnect the high-pressure and other port.

In another system of this invention the distributor valve is connected between the compartments of the piston and can regulate the maximum pressure in same to control the frequency. This can be done best by acting on the counter pressure against which or with which the piston is returned, thereby lengthening or slowing the return stroke.

Yet another system of the invention has a buffer valve with a housing in which the buffer-valve slide is longitudinally displaceable. This slide is formed with a groove and with one port connected to the pilot line and a plurality of longitudinally spaced ports. The controller includes respective ports connected to the longitudinally spaced ports of the buffer valve and at axially spaced locations in the piston chamber. The one port here is connected to the high-pressure side and the groove successively connecting the ports of the passages with the one port. Thus the frequency is controlled by action on the stroke length of the piston.

The control means can also adjust the frequency by varying the pressure differential between the source sides.

The invention can also have the one port connected to the high pressure side and the buffer valve formed with a normally covered port connected to the low-pressure side. The slide is biased such that the normally covered port is only uncovered by the slide to vent the pilot line when the pressure in the pilot line exceeds a predetermined limit. Thus this buffer valve serves and emergency blowout and antijam function.

A regularly operating volumetric pump can be set to operate cyclically and synchronously with the piston and can be connected either between the low-pressure side and the pilot line to move liquid from the latter to the former or can be connected between the low-pressure side and the pilot line to move liquid from the former to the latter.

The slide of the present invention can be spring biased. Alternately it can form two other compartments and have respective faces directed away from the one compartment in the other compartments. One of the other compartments is connected to the high-pressure side and the other of the other compartments is connected to the low-pressure side. Thus the slide is biased by the pressure differential between the sides.

DESCRIPTION OF THE DRAWING

The above and other features and advantages will become more readily apparent from the following, it being understood that any feature described with reference to one embodiment of the invention can be used where possible with any other embodiment. In the accompanying drawing.

SPECIFIC DESCRIPTION

Figure 1:
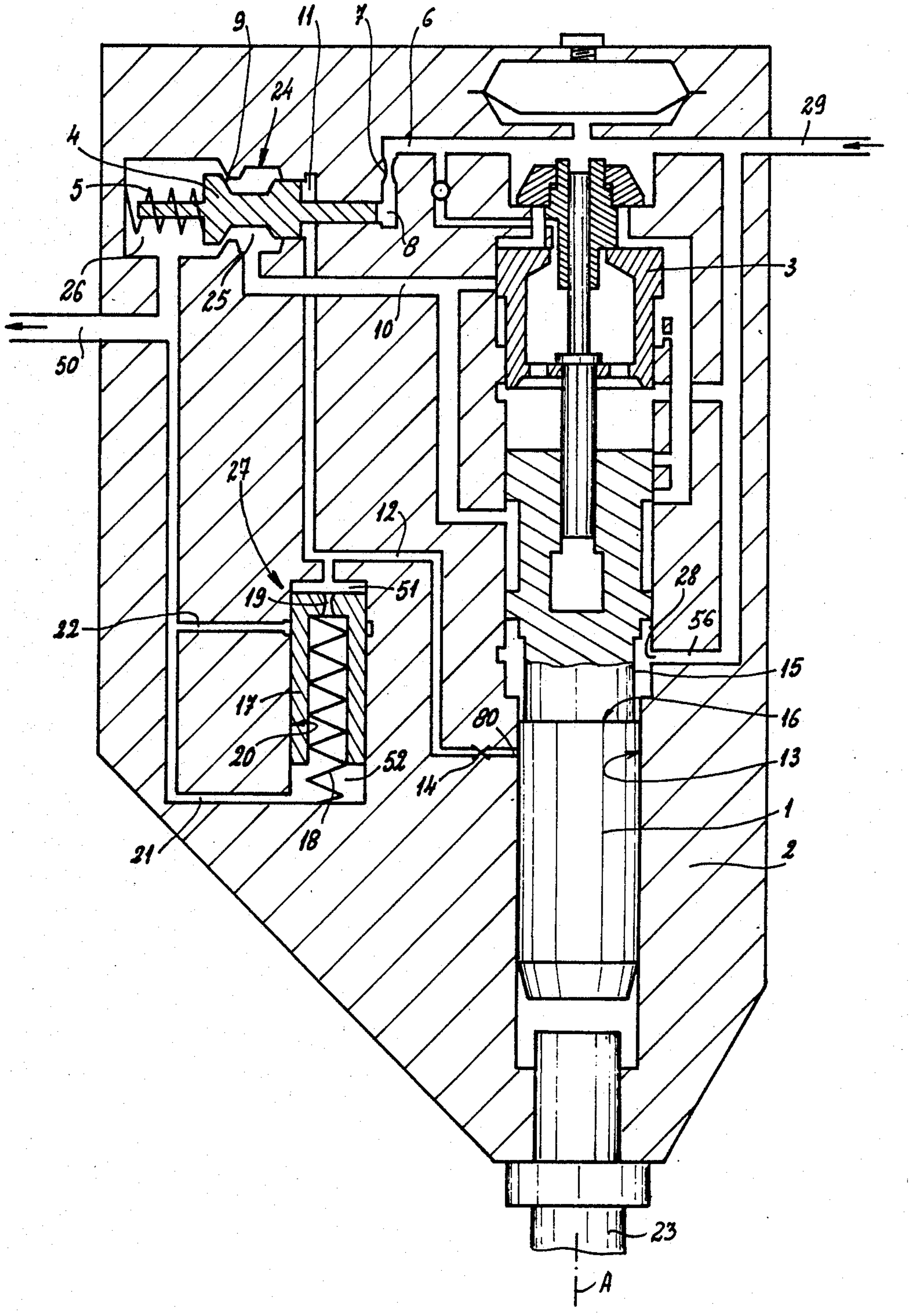
FIG. 1 is a longitudinal section through the apparatus according to the invention with pressure control of the frequency.

As seen in FIG. 1 an apparatus according to this invention has a housing 2 formed with a bore 13 centered on an axis A and containing an axially slidable piston 1 whose front face (down in the drawing) is axially engageable with the rear end of a tool 23 also held in the housing 2. The rear end of the piston 1 is hydraulically actuated by a concentric distributing valve 3 of the autoreversing type described in French Pat. No. 8,114,043. In addition as described in this reference there us a pressure-regulating valve 24 in the housing 2 for controlling the frequency with which the distributor 3 causes the piston 1 to move.

To this end a high-pressure input line 29 is connected via a passage 6 having a restriction 7 to a chamber 8 at the small end of a valve body 4 whose opposite end compresses a spring 5 against the housing 2. The force with which this spring 5 bears against the valve body 4 is adjustable by not illustrated means. The valve 24 also has a compartment 25 and a compartment 26 which can communicate via a gap or restriction 9 formed between the valve body 4 and the housing 2. The size of the gap 9 is normally therefore directly related to the difference between the pressure of the incoming line 29 as monitored in the compartment 8, and the force of the spring 5.

The compartment 25 is connected via a passage 10 to the chamber 13 where it receives liquid from this chamber 13 during the return stroke (upward in the drawing) of the piston 1, presumably after having rebounded from the tool 23 and workpiece. The compartment 26 itself is connected to the low-pressure or sump line 50. Thus the size of the gap 9 determines how quickly the piston 1 can return and, therefore, controls the entire stroke rate by being able to slow or accelerate the return part of the cycle.

According to this invention the valve body 4 faces yet another chamber 11 connected via a pilot line 12 indirectly to the sump 50. In addition this line 12 opens at 80 into the lower region of the bore 13 where it is only uncovered in a groove 15 by a shoulder 16 of the piston 1 when this piston 1 is very close to or touching the tool 23. The high-pressure input line 29 opens into the bore 13 via a passage 56 at a port 28 positioned to communicate with the port 80 through the groove 55 when the front edge 16 has pulled forward past the port 80.

The line 12 also is provided with a restriction 14 and is connected through a buffer valve 27 to the sump 50. This valve 27 has a cylinder 20 provided with a cup piston 17 subdividing it into a back compartment 52 connected via a line 21 with the sump 50 and a front compartment 51 connected to the conduit 12. A small aperture 19 traverses the piston 17 between the chambers 51 and 52 and a spring 18 pushes the piston up toward the front chamber 51. The aperture 19 generally keeps the pressure in the line 12 low, or at least allows it to decay rapidly. In addition a lateral passage 22 from the sump 50 opens near the front end of the bore 20 so that, if in an emergency the pressure gets much too high in the chamber 12, the passage 22 will be uncovered to relieve this pressure.

Figure 2:
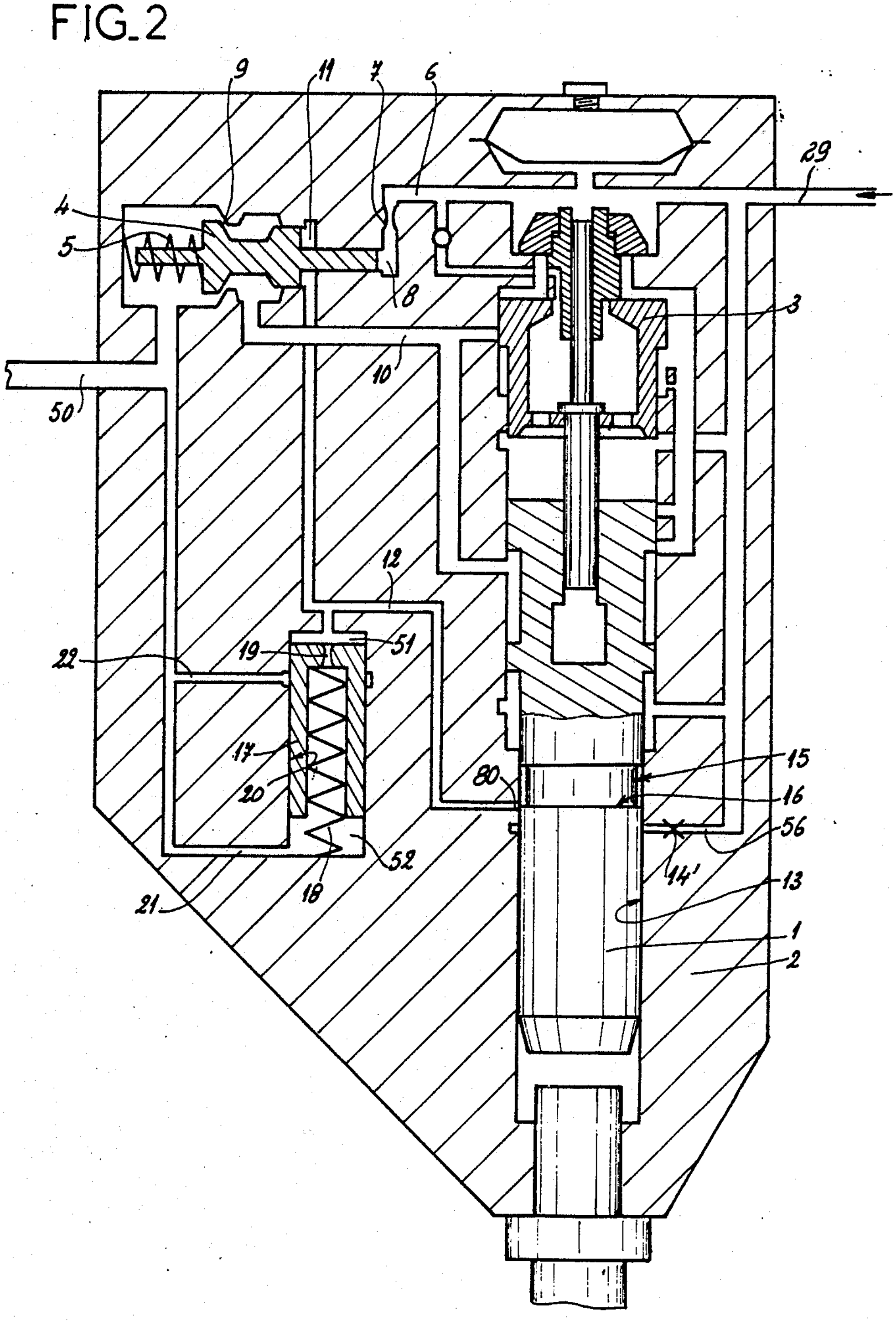
FIG. 2 is a variant on the system of FIG. 1.

The system of FIG. 2 is identical to that of FIG. 1 except that here the passage 56 is provided with a restriction 14', and no restriction is provided in the passage 12. It operates the same as that of FIG. 1.

When the tool 23 is engaging something very hard the piston 1 will strike it and rebound very rapidly. Thus the open time of the valve formed by the groove 15 and ports 28 and 80 is very short and the pressure in the pilot chamber 11 is at most very low. The valve body 4 therefore makes the gap 9 very small or even closes it. This therefore increases the counter pressure in the passage 10 and as a result increases the feed pressure and the speed of the piston 1 when it strikes the tool 23.

On soft ground or when hammering a soft workpiece the piston 1 strikes and pushes the tool 23, remaining a relatively long time in contact with it. Thus the groove 15 covers the ports 28 and 30 for a relatively long time, permitting pressure to build up through the restriction 14 in the line 12 faster than the restriction 19 can vent it. As a result the compartment 11 will be pressurized to widen the gap 9 and reduce the back pressure in the line 10. The return stroke of the piston 1, being opposed with less force, is therefore shorter and the piston 1 reciprocates more rapidly.

If there are no changes in workpiece hardness, the system will move into steady-state operation with the gap 9 open just enough to keep the return stroke of a length sufficient to maintain the pressure in the chamber 11 fairly even, this pressure continuously being bled off via the restriction 19. Such steady-state operation is characterized by the two restrictions 14 (or 14' in FIG. 2) passing liquid at the same volume/time rate. On the other hand if the pressure increases greatly, indicating that the piston 1 is stuck down, the piston 20 moves valve-fashion past the bleed line 22 and completely depressurizes the pilot conduit 12, thereby augmenting back pressure and increasing withdrawal force.

Figure 3:
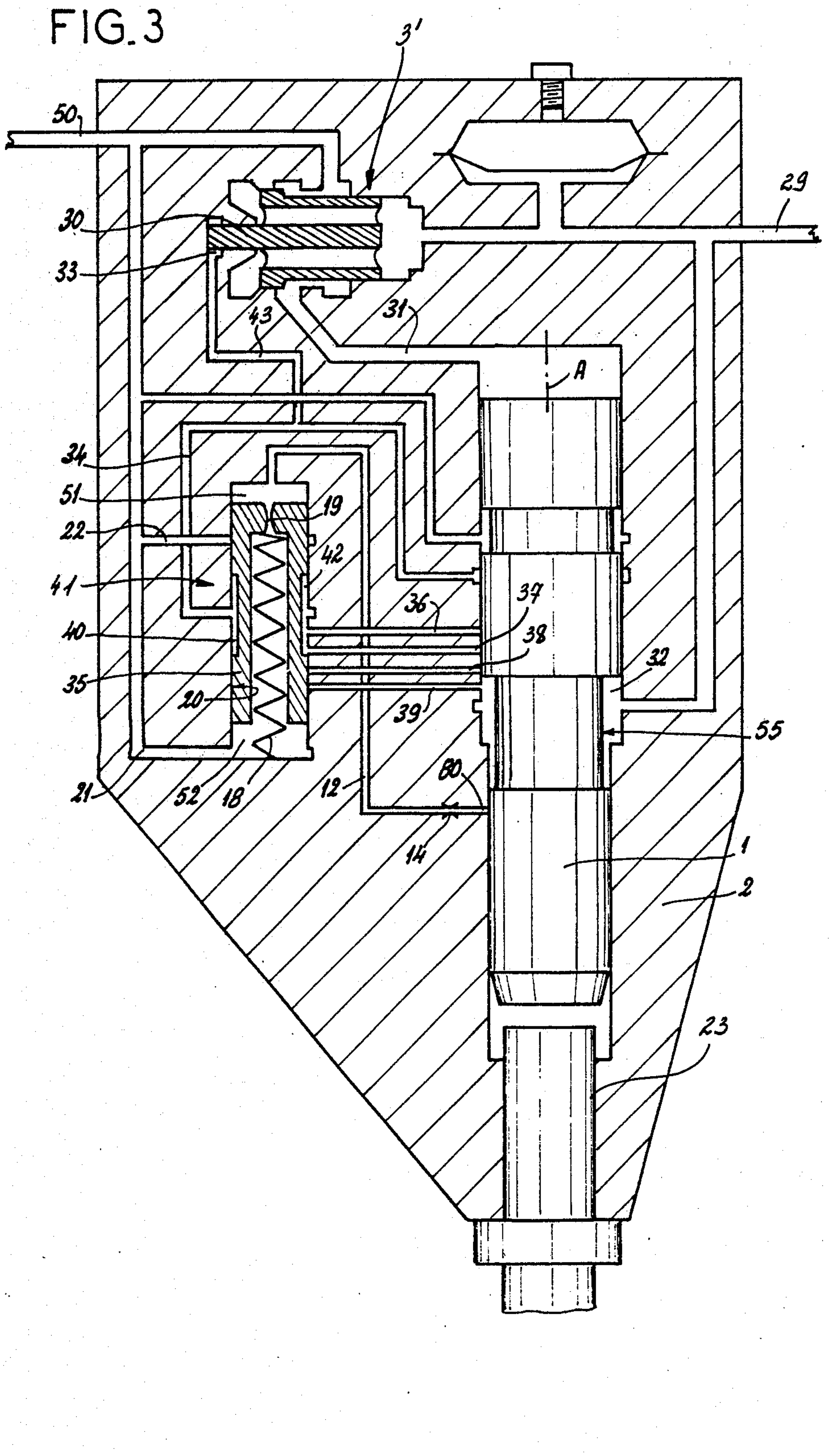
FIG. 3 is a longitudinal section through the apparatus according to the invention with stroke-length control of the frequency.

In FIG. 3 parts identical to those of FIG. 1 bear the same references. Here the piston 1 is controlled by a distributing valve 31 having a valve body 30 that can reciprocate, to connect a line 31 at the back face of the piston 1 either to the high-pressure incoming line 29 or the low-pressure sump line 50. A pilot compartment 33 is pressurized via a passage 43 to move the valve body 31 toward the right-hand position in which it pressurizes the line 31 and advances the piston 1. So long as the pressure in this compartment 33 is less than that in the high-pressure line 29 the body 31 will sit in the illustrated position in which the back piston compartment is depressurized by connection to the line 50.

The chamber 31 is either depressurized near the rear end of its stroke by the piston 1 as is conventional, or is pressurized through a control valve 41 operated like the valve 27 from the pressure in the line 12 having the restriction 14. This valve 41 has a valve body 35 formed with a peripheral groove 42 into which can open on the one hand a plurality of axially spaced passages 36, 37, 38, and 39 also opening at respective levels into the bore 13 and on the other hand a passage 34 connected to the pilot line 43. The position of the valve body 35 is directly dependent on the pressure it receives from the line 12 and this position determines how many of the passages 36–39 are connected to the passage 34.

The piston 1 is formed with a setback 55 forming a return compartment 32 between adjacent sections of different diameters and this compartment 32 is continuously pressurized by the line 29. Thus as the piston 1 retracts, which happens when the chamber 33 is depressurized and the valve 3' is in the illustrated position, it successively connects the passages 36 through 39 to the high-pressure line 29. When enough pressure has been able to get through the lines 36 through 39 and the valve 41 to the lines 34 and 43 to pressurize the chamber 33, the valve 3' will reverse and restart.

The more time the piston 1 spends in any cycle in its forward position, slightly lower than that illustrated, the more time the port 80 is opened and the line 12 has been pressurized and the lower the body 35 will sit in the chamber 20. Going further, as the body 35 advances, that is moves down as seen in FIG. 3, under increasing pressure in its compartment 51, more of the passages 36 through 39 are connected via the compartment 42 to the lines 34 and 43. Thus on soft materials with long residence times of the hammer piston 1 on the tool 23, the lower the valve body 35 will be and therefore the quicker the chamber 33 will repressurized and reverse the retraction of this piston 1. The frequency will increase as the stroke is shortened.

On the other hand when the residence time is very short, indicating the workpiece is hard and the piston 1 is rebounding rapidly from the tool 23, the chamber 51 will not have time to pressurize and the valve body can be high, as illustrated, in which position it covers only the passages 36 and 37 with the groove 42. This will cause the piston 1 to retract fairly far for a long stroke. The result will be slower operation but a more powerful blow as a result of the increase in stroke length during which more force can be transmitted to the piston 1.

Figure 4:
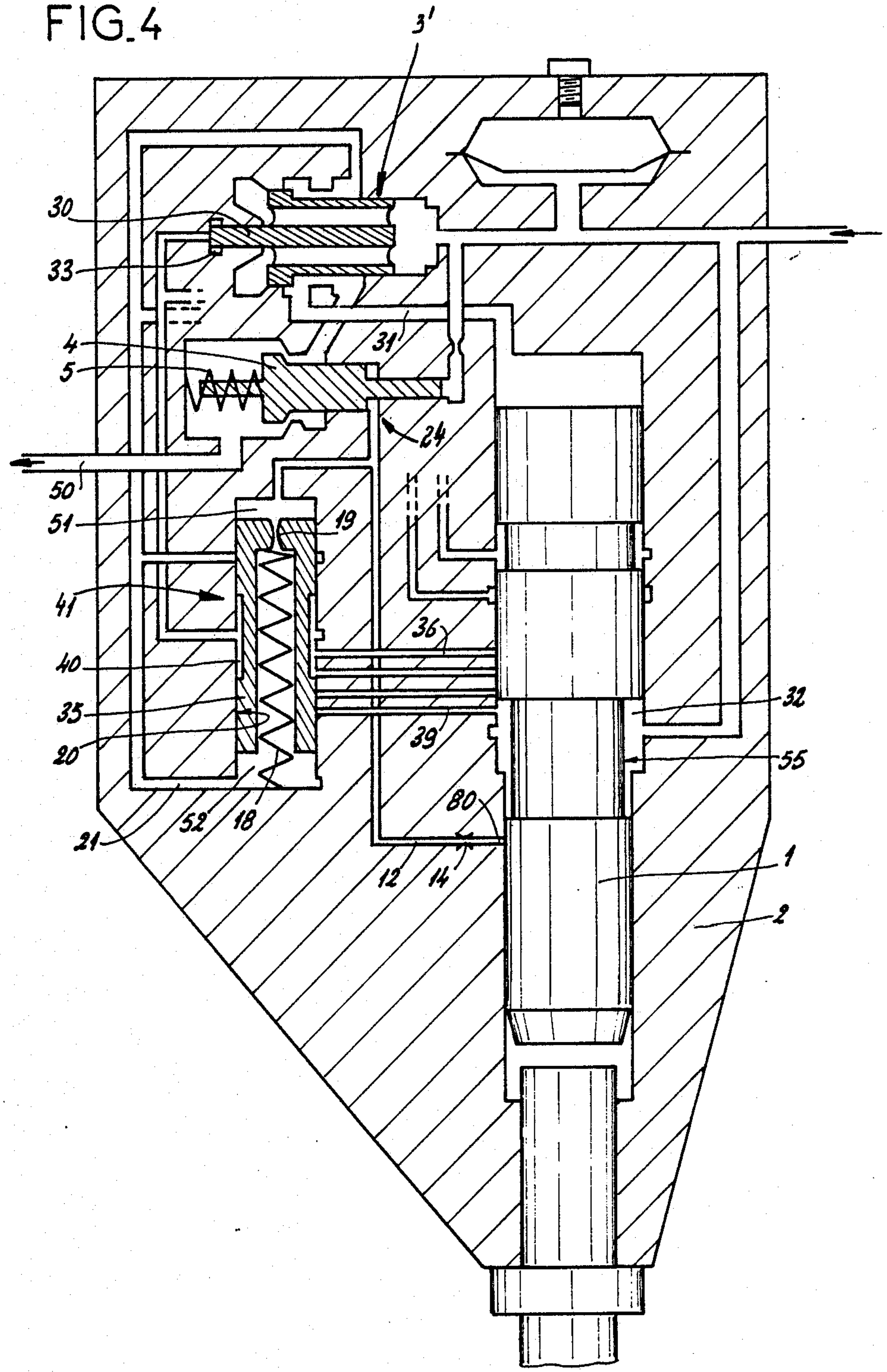
FIG. 4 is a variant on the system of FIG. 1 with supplemental pressure control.

The system of FIG. 4 resembles that of FIG. 3, with identical structure bearing identical references, but the pressure created in the chamber 51 serves on the one hand to replace the valve body 35 to select the stroke length and to operate the valve slide 5 of the regulator valve 24 of the FIG. 1 system. The valve 24 acts on the counterpressure during the return of the apparatus, and also the feed pressure and the frequency of cycling.

Figure 5:
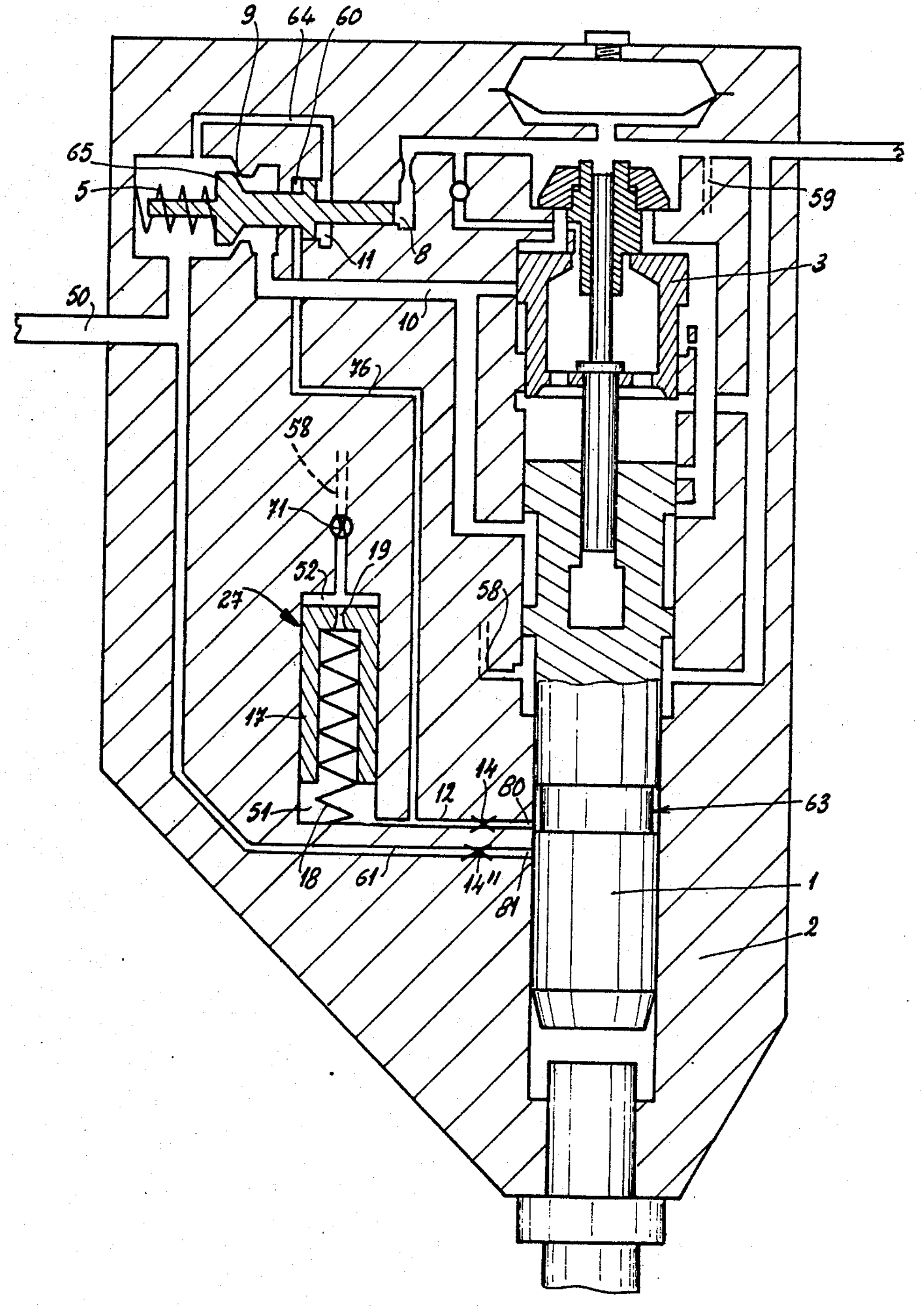
FIGS. 5, 6 and 7 are further variations on the system of FIG. 1.

In FIG. 5 the system operates generally the same as that of FIG. 1, but using a low-pressure pilot compartment 60 fed via a passage 76 connected to the passage 12 which opens into the valve 27' whose valve body 17 and spring 18 are reversed. The compartment 52 is fed high pressure through a restriction 71 from a high-pressure line 58.

Finally a low-pressure branch line 61 has a restriction 14'' and opens at a port 81 into the cylinder 13 just ahead of the port 80.

Thus the longer the piston 1 resides in the front end position, the longer its groove 63 will interconnect the ports 80 and allow the line 76 to be depressurized. This will enlarge the gap, making the counterpressure low and thereby increasing the cycling rate. On the other hand when the piston 1 rebounds rapidly, as when the workpiece is hard, there will belittle time for the chamber 51 to depressurize and, as a result, the chamber 60 will pressurize to close the gap 9 and decrease the frequency.

Figure 6:
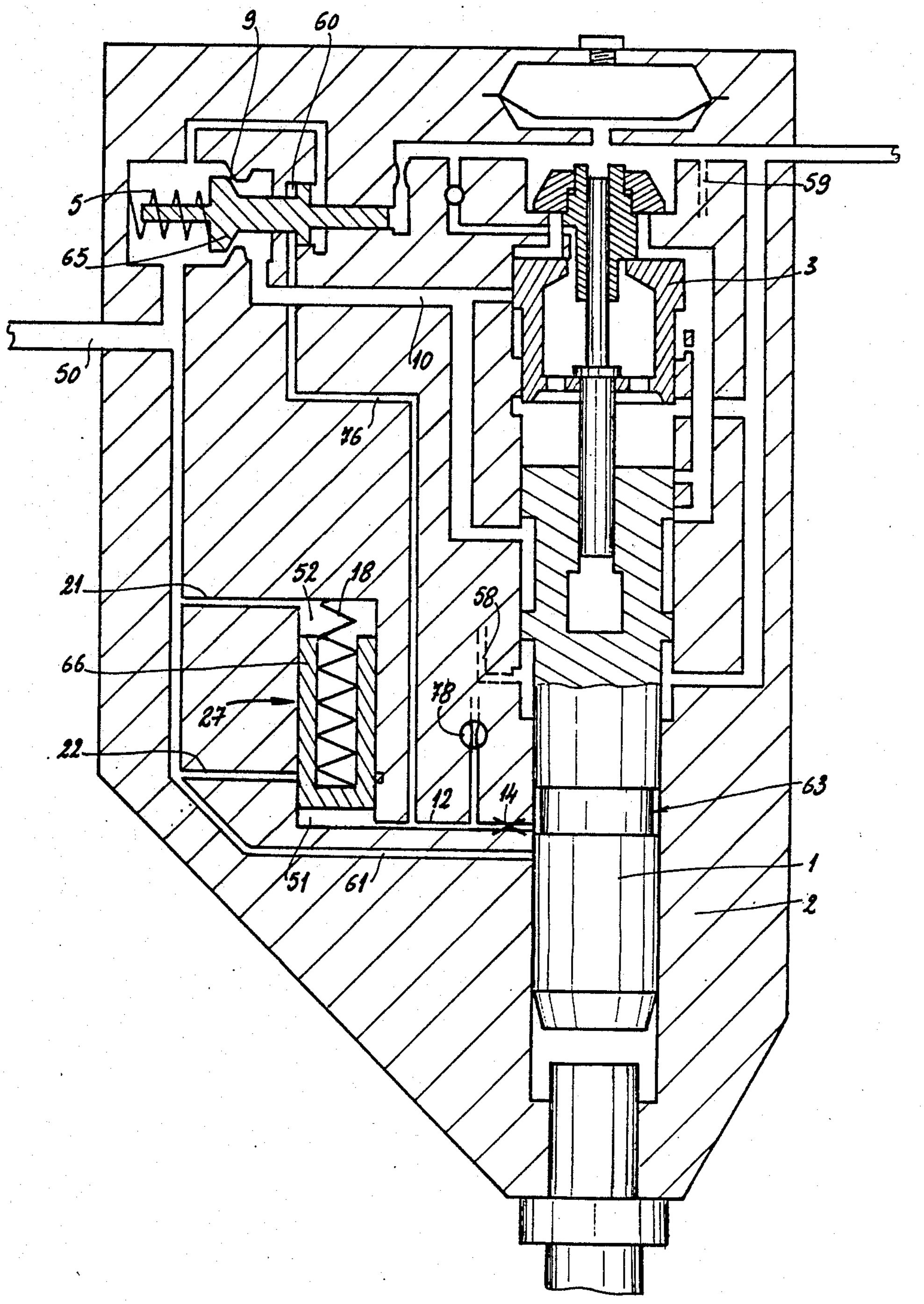

FIG. 6 shows a variant on the FIG. 5 system where a low-pressure line 61 can communicate in the front piston position through the groove 63 with the line 12 that is continuously pressurized via a restriction 78. There is no bleed hole 19 in the piston 66 so that unless the piston 1 is frequently in the forward position and spends some time there, pressure can build up in the passages 12 and 76 and thereby pressurize the compartment 60 and open the gap 9.

Figure 7:
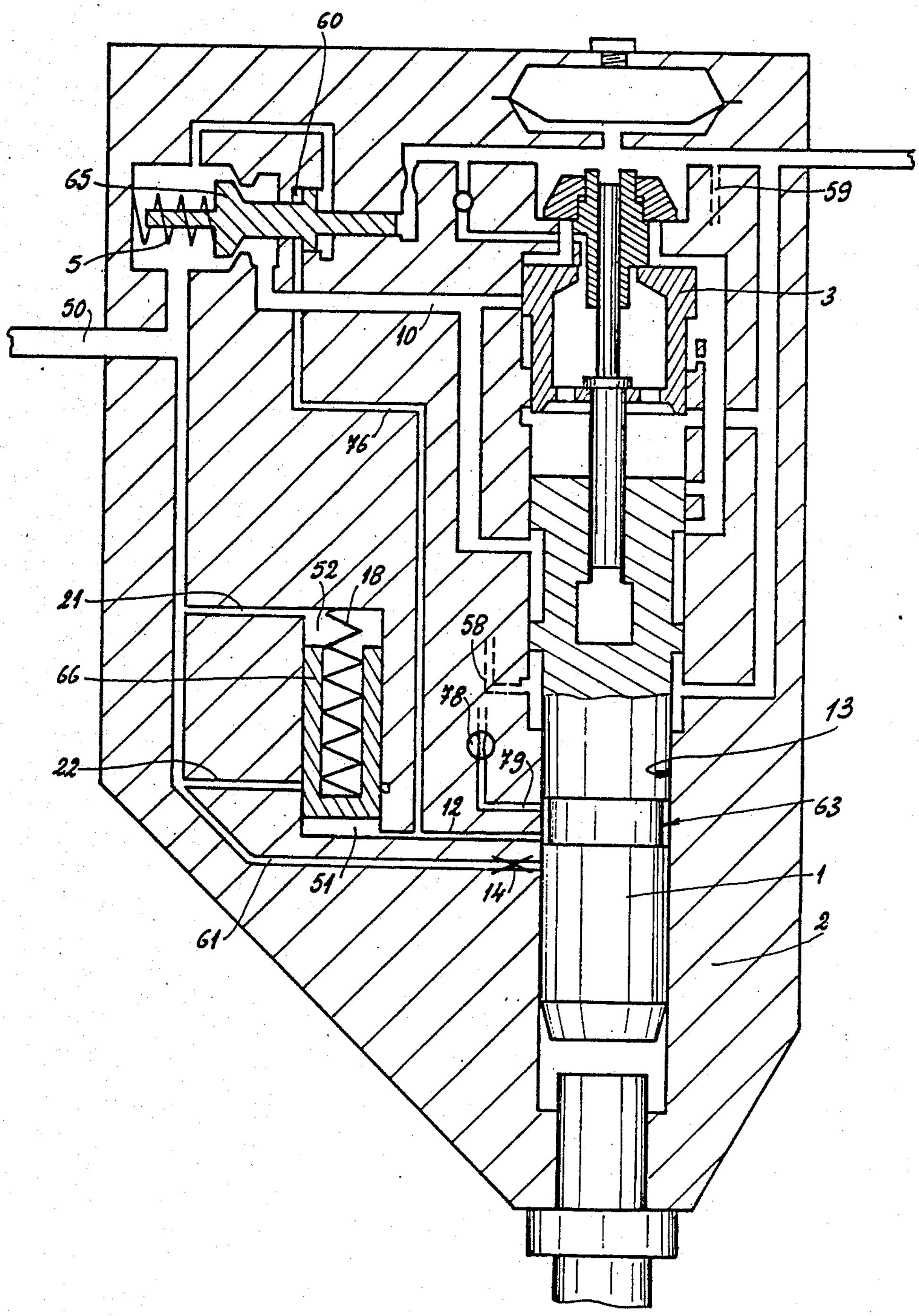
Figure 8:
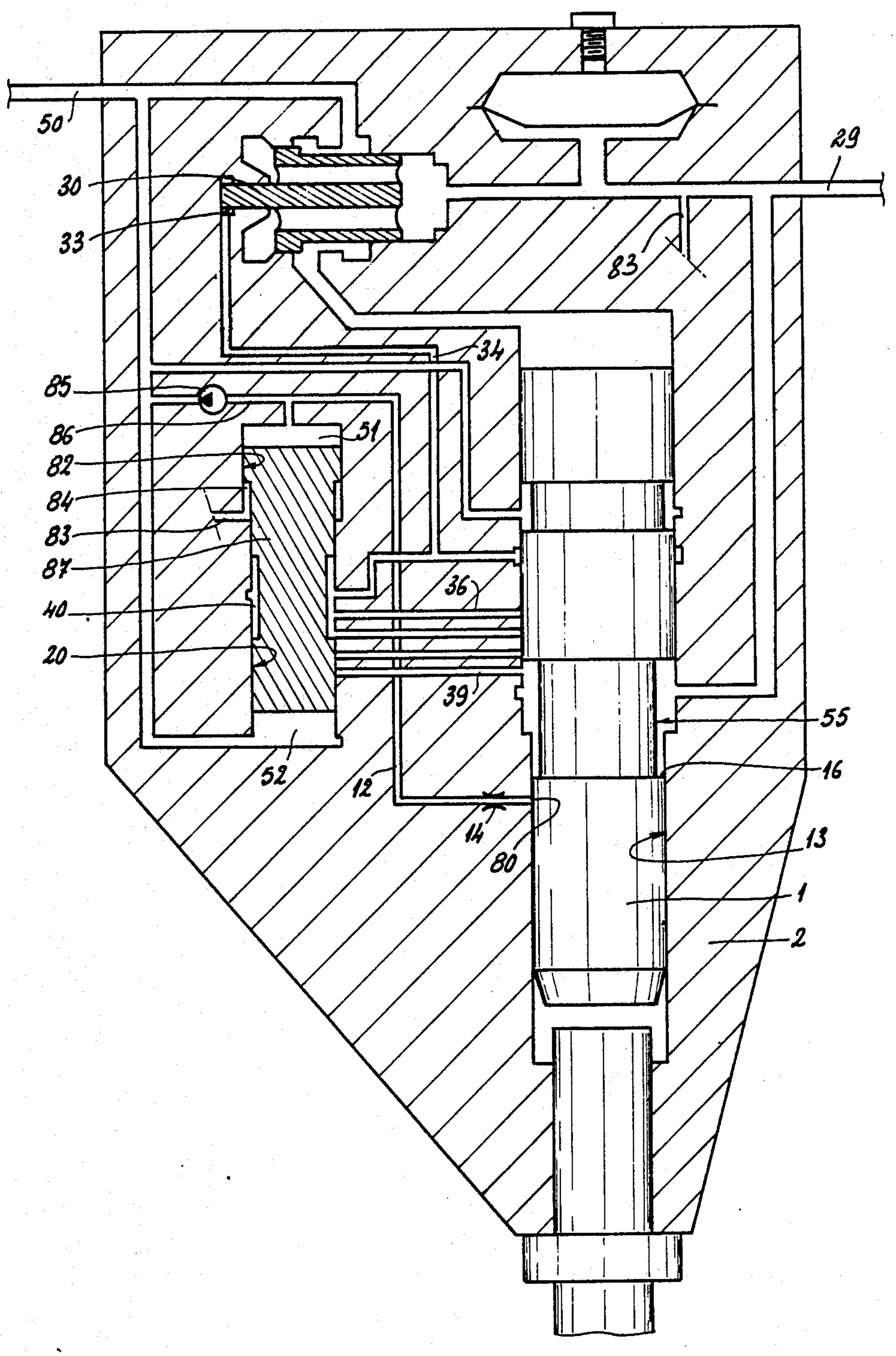
FIGS. 8 and 9 are variants on the system of FIG. 3.

A variant on the FIG. 6 system is shown in FIG. 7, but where the high-pressure restriction 78 opens via a port 79 into the bore 13. Thus there will be a balance for the line 76 between the pressure gained by connection to the port 79 and that lost to the line 61. This system will also pressurize the chamber 51 in accordance with the hardness of the workpiece. Since the speed of the piston 1 is generally constant in its forward and reverse strokes, the amount of pressure injected via the port 79 into the line 12 will be the same with each stroke. On the other hand the amount of pressure lost from the line 12 to the line 61 will be wholly dependent. The arrangement of FIG. 8 is a variant on the system of FIGS. 3 and 4. Its bore 20 is formed with an enlarged part 82 in which fits the wide end of a stepped piston 87 formed with the groove 40. This forms a small-face compartment 84 connected via a line 83 to the high-pressure input line 29. The buffer or control compartment 51 is connected, as in FIG. 3, to the port 80 via the restricted line 12, and to the sump 50 via a small constant-volume pump 85. The opposite compartment 52 is connected to the sump line 50.

Thus there is continuous high pressure urging the valve spool 87 up and substantial low pressure in the compartment 52 urging it down, both these forces being generally constant. The pressure in the chamber 51, which is wholly dependent on the residence time of the piston 1 in the striking position, therefore controls the axial position of the valve body 81 in the bore 20 and how many of the passages 36 through 39 are uncovered.

Such a system will therefore control the length of the stroke, that is when it reverses, in accordance with the residence time of the piston 1 in the fully forward position. No spring is needed, as it merely balances the input and output pressures, with the control pressure making the difference.

Figure 9:
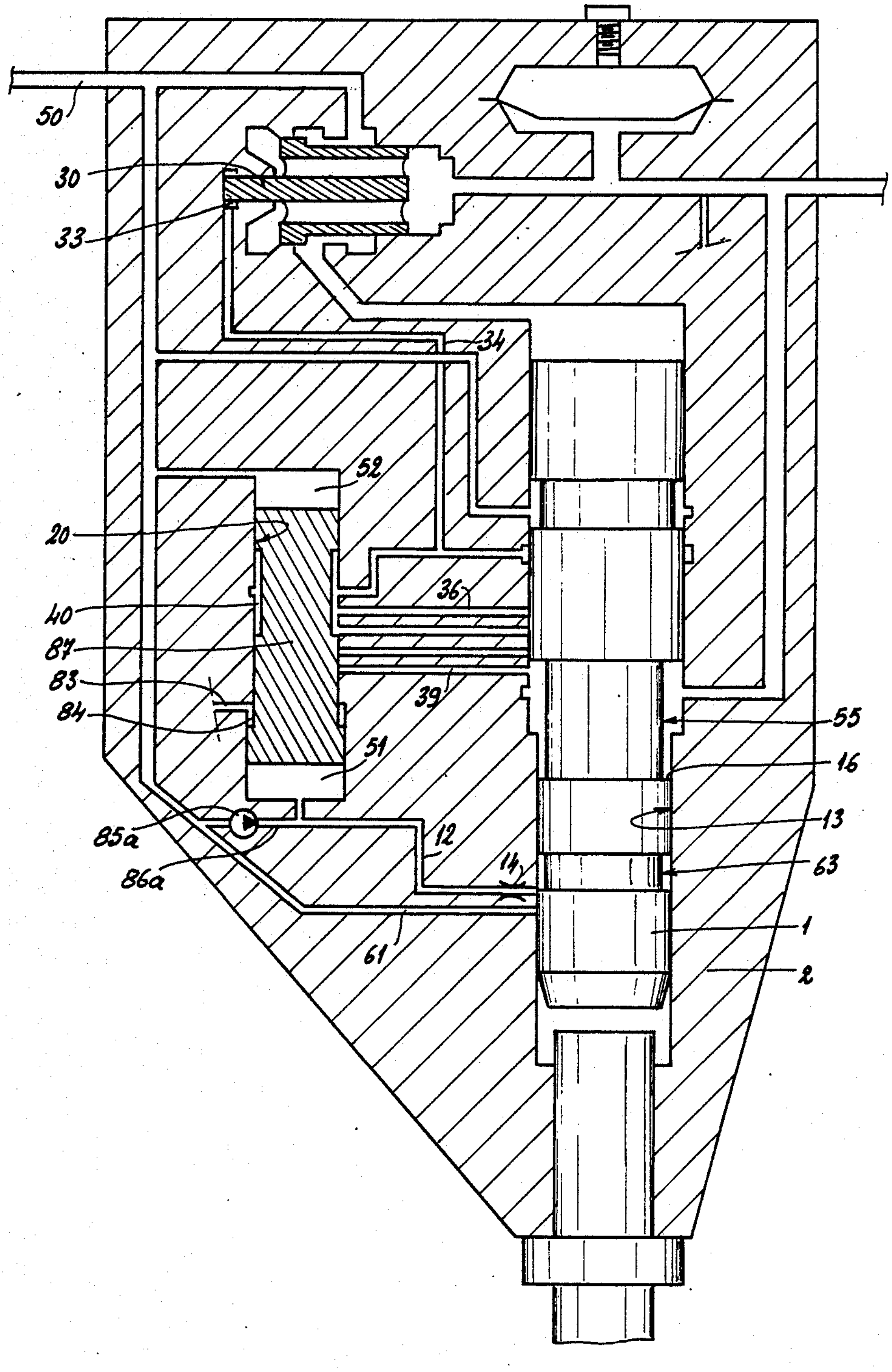

The system of FIG. 9 is substantially the same as that of FIG. 8, but the piston 87 is inverted and the chamber 41 is connected via a small constant-volume pump **85*a* in a line 86*a* to the sump line 50 and via the line 12 to the bore 13 where the groove 63 can connect it straight to the sump 50. Thus the chamber 51 will only be depressurized enough to connect up all of the passages 36 through 39 and shorten the stroke to a minimum when the piston 1 resides a lot of time in its fully forward position, which it does when in soft material. The opposite, that is a lengthening of the stroke, occurs when the residence time is short so the pump 85*a* pressurizes the compartment 51 more quickly than it is depressurized via the groove 63**.

I claim:

1. A reciprocating percussion instrument comprising:

a housing forming an axially centered chamber having a front end and formed thereat with a pair of adjacent ports;

a tool projecting from the housing and exposed axially in the chamber;

a double-acting forming front and back compartments and axially reciprocatable between a rear end position and a front end position at least generally in axial engagement with the piston, the piston having a groove forming a fluid-connection path in the chamber between the ports only in the front end position of the piston;

a pressure source having a high-pressure side and a low-pressure side;

a conduit connecting one of the ports to one of the sides of the pressure source;

control means including a pilot line connected to the other of the ports and a distributor valve connected between the high- and low-pressure sides of the pressure source and the compartments for cyclically alternately pressurizing and depressurizing the compartments and thereby axially reciprocating the piston between its end positions at a frequency dependent on pressure in the pilot line; and pilot-feed means at least periodically connecting a one of the sides of the source to the pilot line for biasing the pressure of same away from that of the side of the source connected to the conduit.

2. The reciprocating percussion instrument defined in claim 1 wherein the pilot feed means is a buffer valve having a slide defining a compartment connected to the pilot line.

3. The reciprocating percussion instrument defined in claim 2 wherein the one port is connected by the conduit to the high-pressure side and the slide defines another compartment connected to the low-pressure side, the slide being formed with a restricted passage constituting the pilot-feed means.

4. The reciprocating percussion instrument defined in claim 2 wherein the one port is connected by the conduit to the low-pressure side and the slide defines another compartment connected to the high-pressure side, the slide being formed with a restricted passage constituting the pilot-feed means.

5. The reciprocating percussion instrument defined in claim 2 wherein the pilot-feed means includes a high-pressure port connected to the high-pressure side and opening into the chamber at a location connected via the groove to the other port in an intermediate position of the piston between its end positions, the slide defining another compartment connected to the low-pressure side.

6. The reciprocating percussion instrument defined in claim 5 wherein the high-pressure port and the other port flank the one port and are at an axial spacing greater than the axial width of the groove, whereby the groove cannot interconnect the high-pressure and other port.

7. The reciprocating percussion instrument defined in claim 2 wherein the buffer valve includes a housing in which the buffer-valve slide is longitudinally displaceable, the slide being formed with a groove and with one port connected to the pilot line and a plurality of longitudinally spaced ports, the control means including respective ports connected to the longitudinally spaced ports of the buffer valve and at axially spaced locations in the piston chamber, the one port being connected to the high-pressure side and the groove successively connecting the ports of the passages with the one port, whereby the frequency is controlled by action on the stroke length of the piston.

8. The reciprocating percussion instrument defined in claim 2 wherein the control means adjusts the frequency by varying the pressure differential between the source sides.

9. The reciprocating percussion instrument defined in claim 2 wherein the one port is connected to the high pressure side and the buffer valve is formed with a normally covered port connected to the low-pressure side, the slide being biased such that the normally covered port is only uncovered by the slide to vent the pilot line when the pressure in the pilot line exceeds a predetermined limit.

10. The reciprocating percussion instrument defined in claim 2 wherein the pilot-feed means includes a regularly operating volumetric pump.

11. The reciprocating percussion instrument defined in claim 10 wherein the pump operates cyclically and synchronously with the piston.

12. The reciprocating percussion instrument defined in claim 10 wherein the pump is connected between the low-pressure side and the pilot line and regularly moves liquid from the latter to the former.

13. The reciprocating percussion instrument defined in claim 10 wherein the pump is connected between the low-pressure side and the pilot line and regularly moves liquid from the former to the latter.

14. The reciprocating percussion instrument defined in claim 2 wherein the slide forms two other compartments and has respective faces directed away from the one compartment in the other compartments, one of the other compartments being connected to the high-pressure side and the other of the other compartments being connected to the low-pressure side, whereby the slide is biased by the pressure differential between the sides.

15. The reciprocating percussion instrument defined in claim 2, further comprising a biasing spring engaging the slide and normally urging same in a direction changing the volume of the compartment.

* * * * *